(12) United States Patent
Rothman et al.

(10) Patent No.: US 7,143,280 B2
(45) Date of Patent: Nov. 28, 2006

(54) METHODS AND APPARATUS TO PROVIDE CONDITIONAL LEGACY SUPPORT THROUGH A COMPATIBILITY SUPPORT MODULE STORED ON A SECURE AREA OR NETWORK

(75) Inventors: Michael A. Rothman, Gig Harbor, WA (US); Vincent J. Zimmer, Federal Way, WA (US); Harry L. Hsiung, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 10/675,486

(22) Filed: Sep. 30, 2003

(65) Prior Publication Data

US 2005/0071621 A1 Mar. 31, 2005

(51) Int. Cl.
*G06F 9/00* (2006.01)
(52) U.S. Cl. .................................. 713/2; 713/1; 713/2
(58) Field of Classification Search .................... 713/1, 713/2
See application file for complete search history.

(56) References Cited

U.S. PATENT DOCUMENTS

| 6,081,890 | A * | 6/2000 | Datta ............................ 713/1 |
| 6,088,794 | A * | 7/2000 | Yoon et al. ..................... 713/2 |
| 2003/0014622 | A1* | 1/2003 | Larvoire ......................... 713/2 |
| 2003/0110370 | A1* | 6/2003 | Fish et al. ....................... 713/2 |
| 2004/0068645 | A1* | 4/2004 | Larvoire ......................... 713/1 |

OTHER PUBLICATIONS

Doran, M. "From Research and Development at Intel: Beyond the BIOS." Intel Developer Forum, Spring 2003. Feb. 18, 2003. pp. 1-36.
"Award Bios 4.51PG Postcodes." Shuttle Connecting Technologies, Support Website. [Retrieved on Aug. 21, 2003]. Retrieved from internet: <URL: http://de.shuttle.com/postcode.htm>.
"BIOS: All About It." [Retrieved on Aug. 21, 2003]. Retrieved from internet: <URL: http://www.programmersheaven.com/wiki/printer.aspx?w=1&p=BIOS>.
"Extensible Firmware Interface Specification." Version 1.10. Intel Corporation. Dec. 1, 2002. pp. Ch1: 6-11; Ch2: 1-5 and 17-20; Ch3: 1-8; Ch5: 26-27; Ch8: 1; Ch11: 2-6, 12, 13, and 16; Ch12: 46; Ch19: 1-3 and 76; and Glossary: 15.
"Extensible Firmware Interface Specification." Version 1.10. Intel Corporation. Dec. 1, 2002. Pages: all. [http://www.intel.com/technology/efi]. Paper copy previously submitted via information disclosure statement on Jan. 15, 2004.

* cited by examiner

*Primary Examiner*—Thomas Lee
*Assistant Examiner*—Sean Weinman
(74) *Attorney, Agent, or Firm*—Hanley, Flight & Zimmerman, LLC

(57) ABSTRACT

Methods and apparatus to provide conditional legacy support are disclosed. In particular, the methods and apparatus initialize a processor in a pre-boot environment using a first computer readable medium. The processor determines if the legacy support is required and selectively locates and loads a compatibility support module into the processor from a second computer readable medium if the processor requires legacy support.

29 Claims, 5 Drawing Sheets

METHODS AND APPARATUS TO PROVIDE CONDITIONAL LEGACY SUPPORT THROUGH A COMPATIBILITY SUPPORT MODULE STORED ON A SECURE AREA OR NETWORK

FIELD OF THE DISCLOSURE

The present disclosure relates generally to processor systems and, more particularly, to methods and apparatus to provide conditional legacy support within processor systems.

BACKGROUND

Computer systems and computer software are constantly evolving. As computer systems evolve, the computer software designed to run on them must also evolve. Often, systems and software evolve at a constant pace, and a new computer system design can execute the latest computer software design. However, there are instances in which a new computer system is designed to operate old computer software such as an old operating system. For this reason, new computer designs must maintain backward compatibility with old computer software.

It is known that computer system designers implement a firmware resource on computer system designs that, in a pre-boot environment, initializes a computer system. This firmware resource is known as a basic input output system (BIOS) and is used to provide basic functionality (e.g., display output, keyboard input, disk drive operation, etc.) to a computer system prior to executing an operating system boot process. The BIOS is generally stored on a non-volatile memory device such as a ROM or a flash memory that is designed or integrated into most computer systems.

In recent years, newer firmware resources have been designed that provide functionality similar to the BIOS. One such resource is known as an extensible firmware interface (EFI) that initializes a computer system prior to execution of an operating system boot process. In general, the EFI is targeted toward supporting newer operating systems and application programs. However, for new computer designs to maintain backward compatibility with older or legacy software, the EFI can provide legacy support through compatibility resources known as compatibility support modules. The compatibility support modules are firmware instruction modules that, upon execution, enable a computer system to provide support for legacy computer software, such as legacy operating systems. The compatibility support modules are stored in the ROM or flash memory on which the EFI is stored so that the EFI can unconditionally load the compatibility support module to the computer system prior to executing a software boot process.

DETAILED DESCRIPTION

Although the following discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

Figure 1:
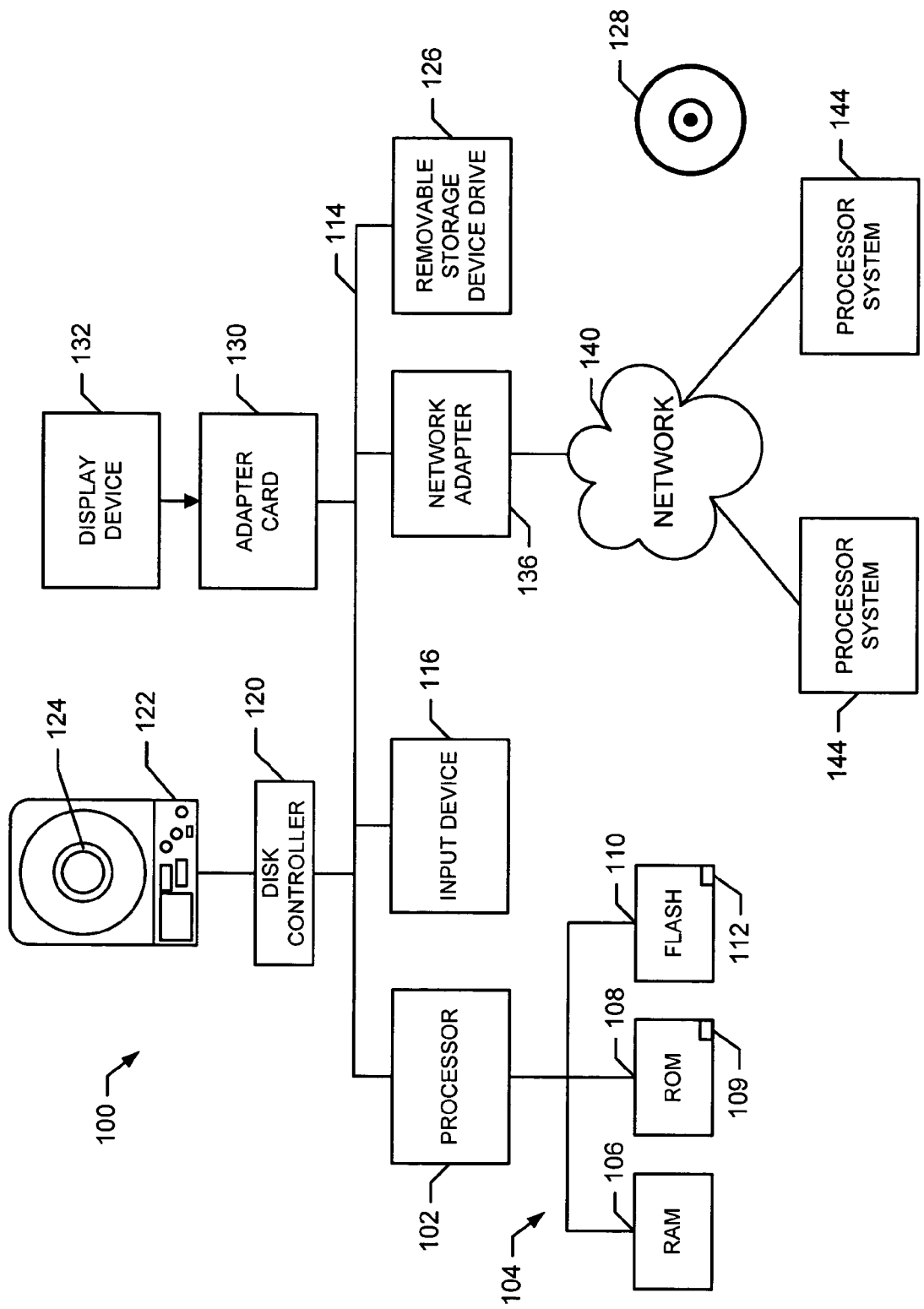
FIG. 1 is a diagram of an example processor system.

Turning now to FIG. 1, an example processor system 100 includes a processor 102 having associated system memory 104. The system memory 104 may include one or more of a random access memory (RAM) 106, a read only memory (ROM) 108 and a flash memory 110. The ROM 108 and the flash memory 110 of the illustrated example may respectively include boot blocks 109 and 112.

The processor 102, in the example of FIG. 1, is coupled to an interface, such as a bus 114 to which other peripherals or devices are interfaced. In the illustrated example, the peripherals interfaced to the bus 114 include an input device 116, a disk controller 120 communicatively coupled to a mass storage device 122 (i.e., hard disk drive) having a host protected area 124, and a removable storage device drive 126. The removable storage device drive 126 may include associated removable storage media 128, such as magnetic or optical media.

The example processor system 100 of FIG. 1 also includes an adapter card 130, which is a peripheral coupled to the bus 114 and further coupled to a display device 132.

The example processor system 100 may be, for example, a conventional desktop personal computer, a notebook computer, a workstation or any other computing device. The processor 102 may be any type of processing unit, such as a microprocessor from the Intel® Pentium® family of microprocessors, the Intel® Itanium® family of microprocessors, and/or the Intel XScale® family of processors.

The memories 106, 108, and 110, which form some or all of the system memory 104, may be any suitable memory devices and may be sized to fit the storage demands of the system 100. The ROM 108, the flash memory 110, and the mass storage device 122 are non-volatile memories. Additionally, the mass storage device 122 may be, for example, any magnetic or optical media that is readable by the processor 102.

The input device 116 may be implemented by a keyboard, a mouse, a touch screen, a track pad or any other device that enables a user to provide information to the processor 102.

The display device 132 may be, for example, a liquid crystal display (LCD) monitor, a cathode ray tube (CRT) monitor, or any other suitable device that acts as an interface between the processor 102 and a user via the adapter card 130. The adapter card 130 is any device used to interface the display device 132 to the bus 114. Such cards are presently commercially available from, for example, Creative Labs and other like vendors.

The removable storage device drive 126 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 128 is complimentary to the removable storage device drive 126, inasmuch as the media 128 is selected to operate with the drive 126. For example, if the removable storage device drive 126 is an optical drive, the removable storage media 128 may be a CD-R disk, a CD-RW disk, a DVD disk or any other suitable optical disk. On the other hand, if the removable storage device drive 126 is a magnetic media device, the removable storage media 128 may be, for example, a diskette, or any other suitable magnetic storage media.

The example processor system 100 also includes a network adapter 136 (i.e., a processor peripheral), such as, for example, an Ethernet card or any other card that may be wired or wireless. The network adapter 136 provides network connectivity between the processor 102 and a network 140, which may be a local area network (LAN), a wide area network (WAN), the Internet, or any other suitable network. As shown in FIG. 1, further processor systems 144 may be coupled to the network 140, thereby providing for information exchange between the processor 102 and the processors of the processor systems 144.

Figure 2:
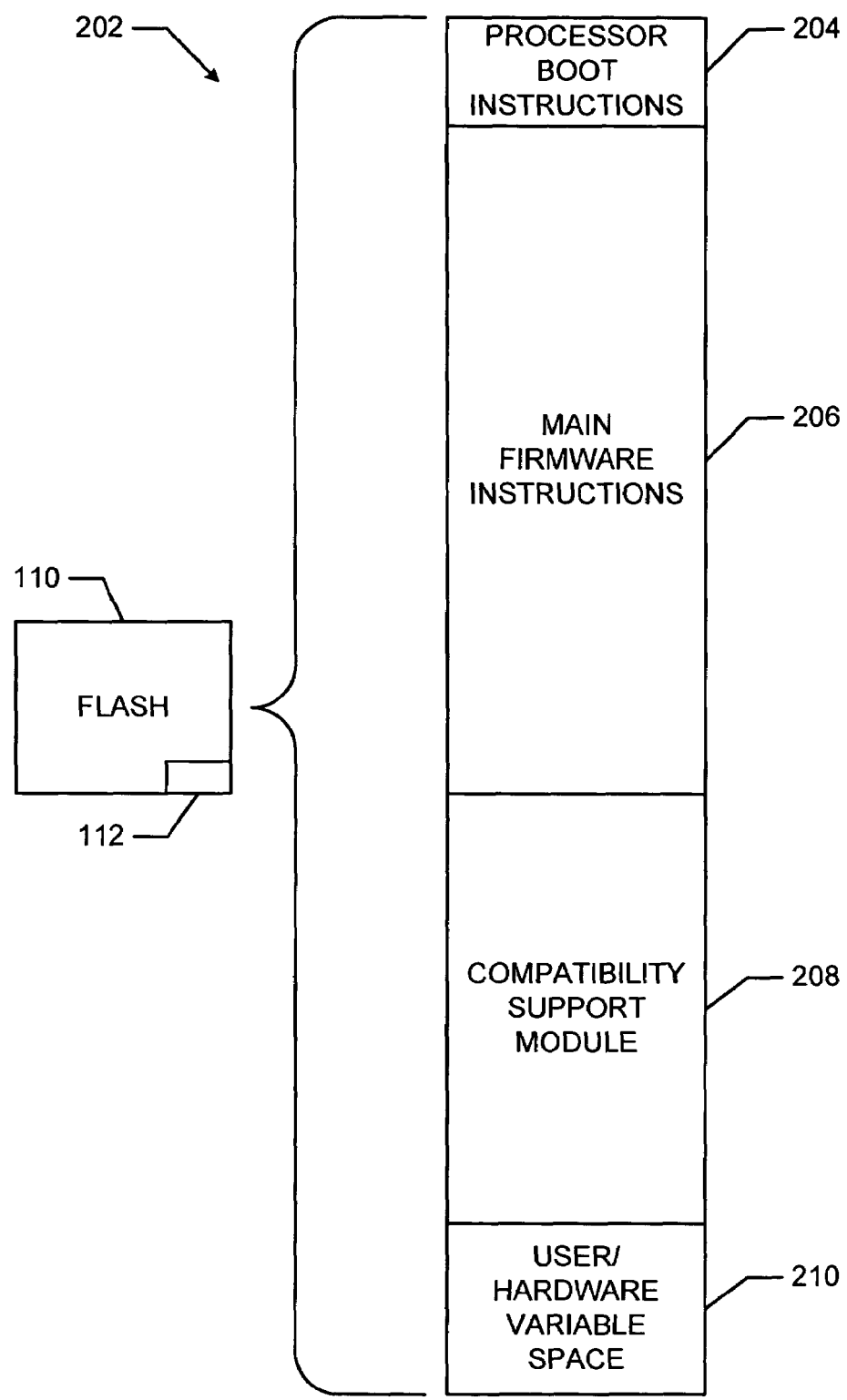
FIG. 2 is a known memory allocation configuration of a pre-boot initialization firmware image.

FIG. 2 is a known memory allocation configuration of a processor system initialization firmware image 202. The firmware image 202 enables configuration of a processor and a processor system (i.e., the processor 102 and the processor system 100 of FIG. 1). The firmware image 202 includes processor boot instructions 204, main firmware instructions 206, a compatibility support module 208, and a user/hardware variable space 210, all of which are stored on a single non-volatile memory coupled to a processor (i.e., the processor 102 of FIG. 1) for accessing prior to loading and executing a software boot target (e.g., an operating system or application program). As shown in FIG. 2, the firmware image 202 may be completely stored on the flash memory 110 or alternatively on any other single non-volatile memory such as the ROM 108 of FIG. 1.

During execution, the processor boot instructions 204 cause the processor 102 to configure basic processor resources such as initializing system clocks, initializing memory interfaces, zeroing registers, resetting counters and the like, thereby enabling the processor 102 to further initialize portions of the processor system 100. Furthermore, the processor boot instructions 204 inform the processor 102 of the location of the main firmware instructions 206.

In general, the main firmware instructions 206 may be associated with a processor system initialization resource known as an extensible firmware interface (EFI) that is comprised of instructions associated with initializing portions of the processor system 100. The responsibilities of the EFI 206 are similar to those of a traditional or legacy basic input output system known as a BIOS in that both are configured to establish a hardware/software interface prior to an operating system boot process and cause the processor system 100 to load and execute an operating system boot target. The EFI 206 is generally configured to support legacy and future operating systems and application programs, while the BIOS is limited to supporting legacy operating systems and application programs. Accordingly, the EFI 206 may replace the BIOS. The EFI 206 is generally designed to support future operating systems and application programs in a native manner, while providing support for legacy operating systems and application programs through firmware modules known as compatibility support modules.

As shown in FIG. 2, a compatibility support module 208 may also be stored in the flash memory 110. The compatibility support module 208 includes instructions that may be executed by the processor 102 to provide support for legacy operating systems or application programs by configuring the processor system 100 to operate as if the legacy BIOS were present. In particular, the compatibility support module 208 initializes a BIOS Data Area and legacy interrupt vectors similar to the manner in which the BIOS does.

A user/hardware variable space 210 is also included in the flash memory 110. The user/hardware variable space 210 stores initialization parameters specific to the processor system 100 such as processor type, mass storage device type, memory configuration settings, etc. The initialization parameters are used by the EFI 206 and the compatibility support module 208 for initializing the processor system 100 in a pre-boot environment (i.e., prior to executing an operating system boot process) in preparation for booting an operating system or otherwise starting an application program.

Figure 3:
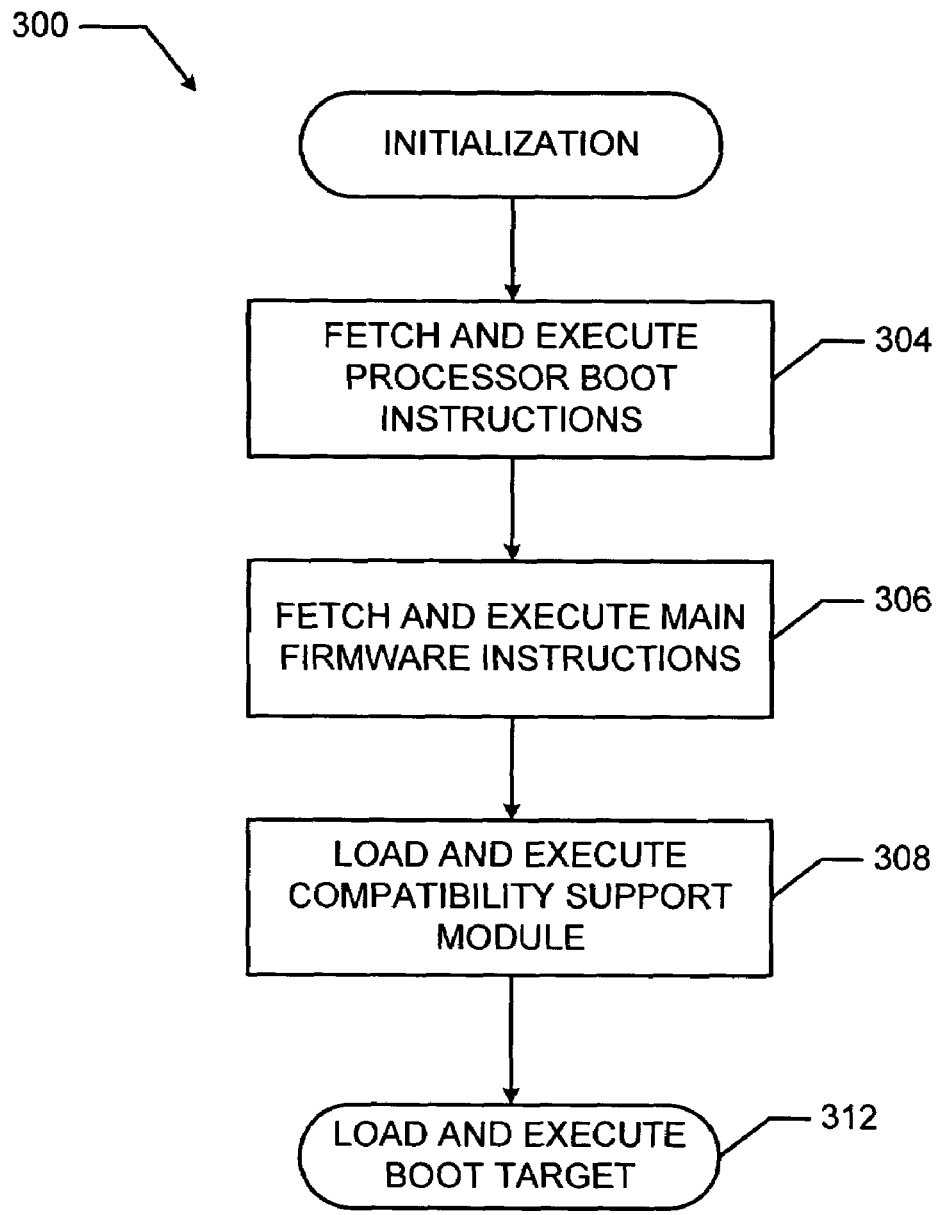
FIG. 3 is a flow diagram of a known initialization process that initializes a processor system prior to executing an operating system boot process.

A shown in FIG. 3, an initialization process 300 of a processor system (i.e., the processor system 100 of FIG. 1) may be performed by a processor such as the processor 102 of FIG. 1 based on, for example, the instructions and variables contained in the firmware image 202 of FIG. 2 (i.e., the processor boot instructions 204, the main firmware instructions or EFI 206, the compatibility support module 208 and the user/hardware variable space 210). It is known that the processor system initialization firmware image 202, as described above, may replace the BIOS in the processor system 100 and is responsible for initializing portions of the processor system 100 prior to executing an operating system boot process. Furthermore, the initialization process 300 may begin following a reset event such as, for example, a system reset event or a power-on event. However, the initialization process 300 may also begin as a result of other events that are not limited to reset events.

The processor 102 begins fetching and executing the processor boot instructions 204 at block 304. The processor boot instructions 204 cause the processor 102 to configure basic processor resources enabling it to further initialize portions of the processor system 100.

The processor 102 may begin to initialize portions of the processor system 100 by fetching and executing instructions from the EFI 206 (block 306). The EFI 206 is generally responsible for further initialization of the processor 102, performing system tests and initializing portions of the processor system 100 such as the display adapter 130, the input device 116, the network adapter 136, and the removable storage device drive 126. Furthermore, the EFI 206 establishes a hardware/software interface that allows an operating system or application program to run on the processor system 100 without knowing at least some of the specific hardware details of the processor system 100. The hardware/software interface and initializations performed by the EFI 206 provide support for newer and future operating systems and application programs. However, the EFI 206 may also enable support for legacy operating systems and application programs through the compatibility support module 208.

In the known initialization process 300 of FIG. 3, the EFI 206 loads and executes the compatibility support module 208 (block 308) from the flash memory 110 on which the EFI 206 is stored. Furthermore, loading and executing the compatibility support module 208 (block 308) is an integral process of the EFI 206 that is always performed, regardless of whether the software boot target (i.e., the operating system or application program) requires legacy support. In this manner, the processor system 100 is always configured to support hardware/software interfaces that allow newer and legacy operating systems and application programs to communicate with the hardware comprising the processor system 100. Accordingly, the processor system 100 may load and execute a software boot target (block 312).

Figure 4:
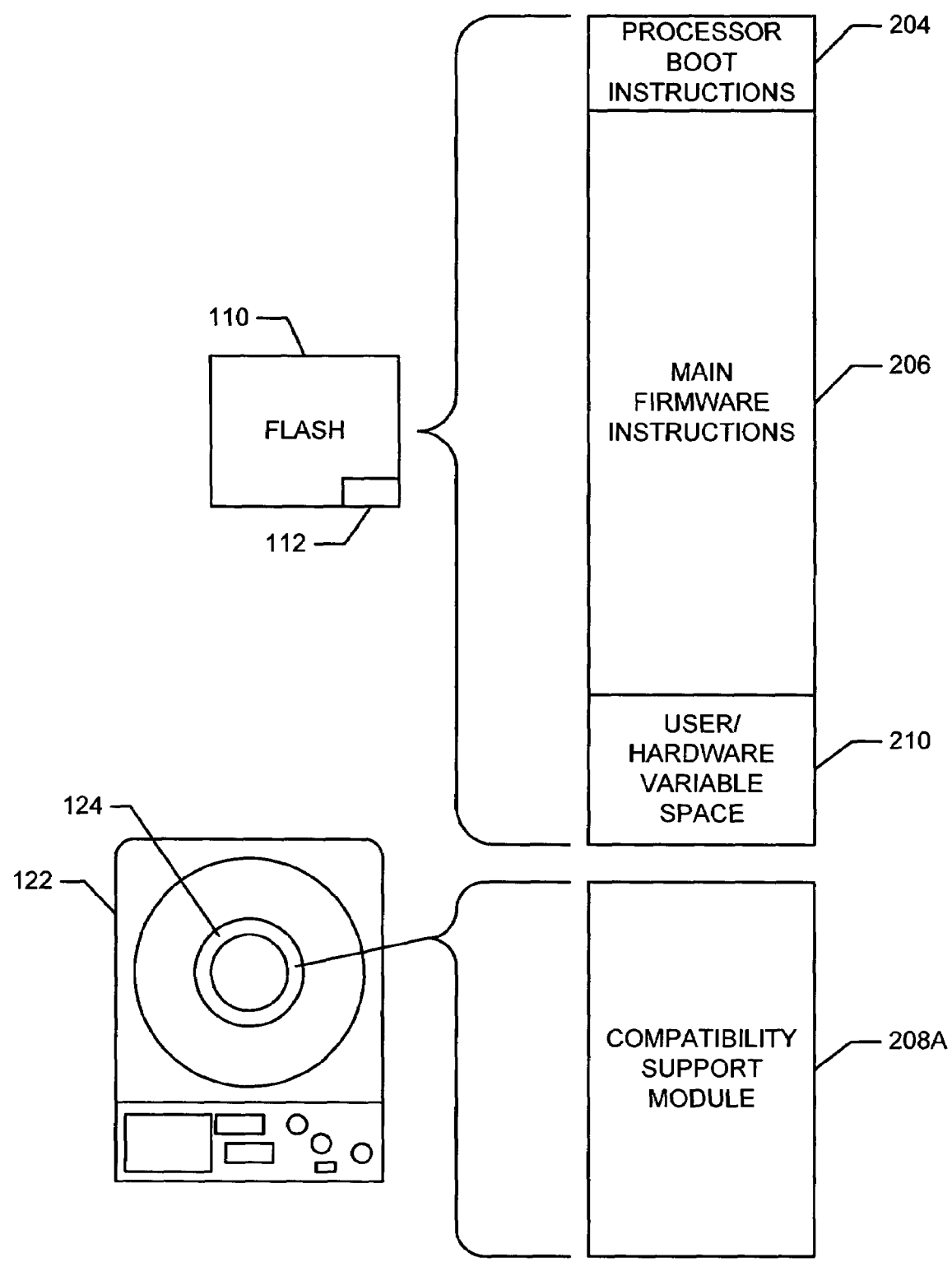
FIG. 4 is an example memory allocation configuration that supports a cross-memory implementation.

As stated above, using the known memory allocation configuration, the entire processor system initialization firmware image 202 is stored on a single non-volatile computer readable medium or memory device (i.e., the flash memory 110). Turning now to FIG. 4, an example memory allocation configuration allows the firmware image 202 of FIG. 2 to be stored on at least two non-volatile memory devices. In the example memory allocation configuration, the boot instruction segment 204, the main instruction segment, or EFI 206, and the user/hardware variable space 210 may be stored on the flash memory 110, while the compatibility support module 208 may be stored on a separate, alternate non-volatile memory device.

FIG. 4 illustrates the example memory allocation configuration that supports a cross-memory implementation of memory allocation configuration. Unlike the known memory allocation configuration described in connection with FIG. 2, the memory allocation configuration disclosed herein allows a compatibility support module 208A, which may be substantially similar to the compatibility support module 208 described in greater detail in connection with FIG. 2, to be stored on an alternate non-volatile computer readable medium that is separate from the flash memory 110. For example, as shown in FIG. 4, the alternate non-volatile computer readable medium may be the mass storage device 122 (i.e., a hard disk drive) of FIG. 1. Furthermore, any alternate non-volatile computer readable medium that may be communicatively coupled to and read by a processor system (i.e., the processor system 100 of FIG. 1) may be used to store the compatibility support module 208A. For example, the removable storage medium 128 of FIG. 1 may be used to store the compatibility support module 208A. Storing the compatibility support module 208A on a separate non-volatile computer readable medium enables the flash memory 110 to be implemented by a smaller density flash memory device, thereby saving cost and space. Additionally, selective loading of the compatibility support module 208A based on need, saves boot time.

In one example, the compatibility support module 208A may be stored in a secure or protected area to prevent intentional or accidental tampering and/or corruption. As shown in the example of FIG. 4, the compatibility support module 208A is stored on a secure area or host protected area (HPA) 124, of the hard disk drive 122. As will be readily apparent by those ordinarily skilled in the art, the HPA 124 is a secure storage area that is protected by the EFI 206 in a manner such that a user is prohibited from accidentally or intentionally accessing its contents. This security may be implemented by requiring the processor system 100 to be in a special operating mode and/or requiring the user to provide a password. In other words, storing the compatibility support module 208A on the HPA 124 provides a level of security that prohibits a user or software process from accessing it and/or corrupting it.

Alternatively, the compatibility support module 208A may be stored on a protected system partition (not shown). The protected system partition may be created by the EFI 206 and, similar to the HPA 124, provides security against accidental or intentional accesses to information or data that is stored on it such as the compatibility support module 208A.

In some instances, the compatibility support module 208A may be stored on and provided by an externally accessible source. The externally accessible source may include a removable computer readable medium, such as a processor system utility disk (i.e., the removable storage media 128 of FIG. 1). Alternatively, the external source may include at least one of the processor systems 144 capable of communicating with the processor system 100 through the network 140, as shown in FIG. 1. Furthermore, prior to an operating system boot process the processor system 100 may selectively load and execute the compatibility support module 208A from any of these external sources, or the processor system 100 may copy the compatibility support module 208A to a local computer readable medium such as the hard disk drive 122.

Figure 5:
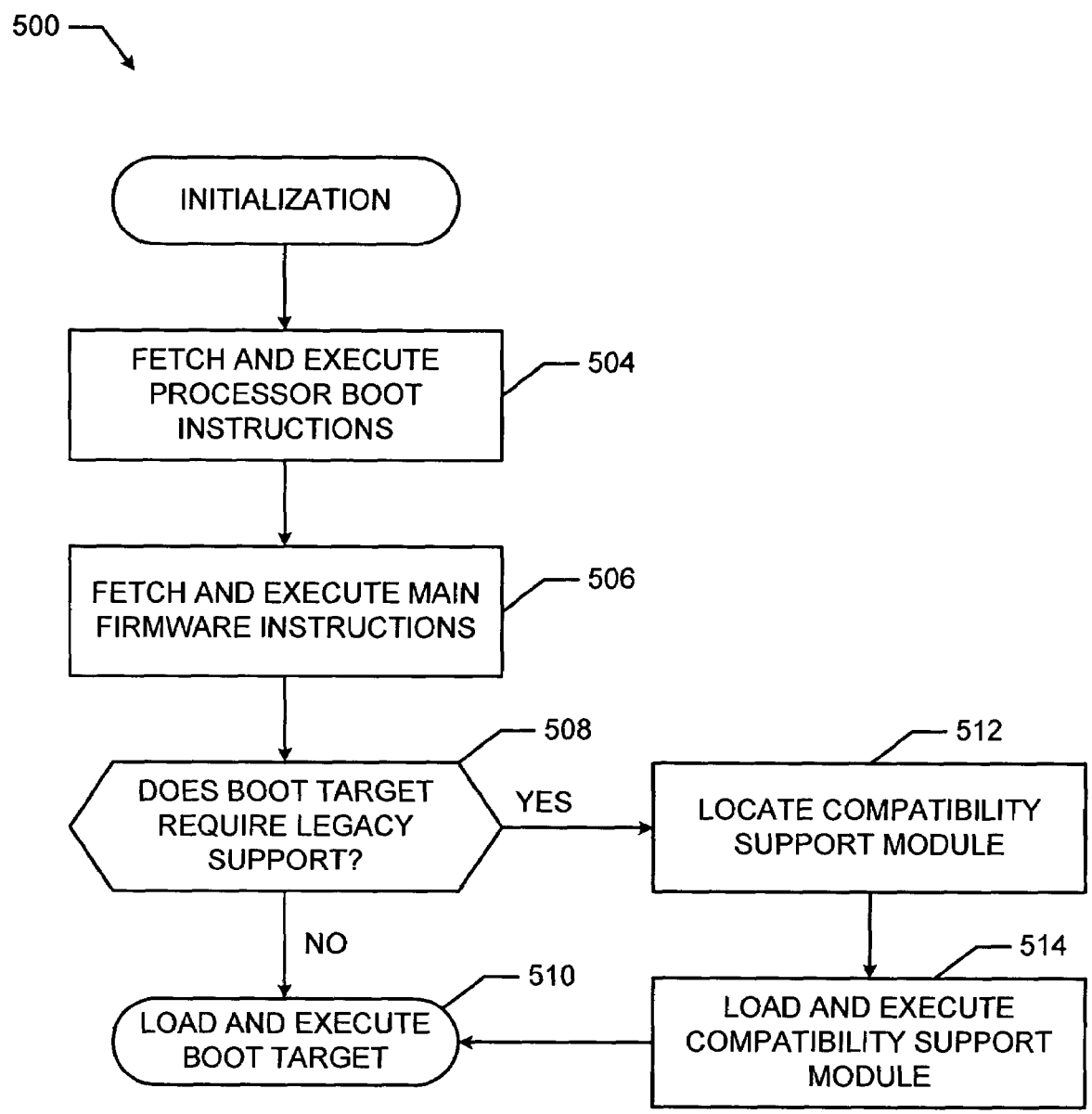
FIG. 5 is a flow diagram of an example initialization process that initializes a processor system prior to executing an operating system boot process.

FIG. 5 is a flow diagram of an example initialization process 500 that may be executed by, for example, the processor system 100 of FIG. 1. The process 500 may be performed by a processor such as the processor 102 of FIG. 1 based on the instructions and variables comprising the example memory allocation configuration of FIG. 4 (i.e., the processor boot instructions 204, the main firmware instructions or EFI 206, the user/hardware variable space 210 stored on the flash memory 110 and the compatibility support module 208A stored on an alternate computer readable medium, such as the hard disk drive 122). As will become apparent in the following description, the disclosed process differs from the known method of FIG. 3 in that the EFI 206 enables legacy support in a conditional manner. In other words, the EFI 206 determines whether a software boot target requires legacy support and enables legacy support only if such support is required, thereby saving time in the initialization process when legacy support is not required. Also, because the compatibility support module 208A is stored on an alternate computer readable medium, the density of the flash memory 110 may be smaller thereby saving space and money.

The processor 102 begins to execute the processor boot instructions 204 at block 504. As described above, in connection with FIG. 3, the processor boot instructions 204 cause the processor 102 to enable and initialize basic processor resources, thereby enabling the processor 102 to further initialize portions of the processor system 100.

Instructions from the EFI 206 may then be fetched and executed at block 506. After further initialization of the processor 102, performing system tests, and initializing portions of the processor system 100, the EFI 206 determines whether a software boot target requires legacy support (block 508). A software boot target may indicate that it requires legacy support by modifying a variable value such as, for example, a device path variable in the user/hardware variable space 210. The device path variable may be located in a boot options section of the user/hardware variable space 210 and a plurality of device path variables may exist if there are several software boot targets available to be loaded and executed by the processor system 100.

If the software boot target does not require legacy support, the software boot target is loaded and executed (block 510). Alternatively, if legacy support is required to support the software boot target, the processor 102 locates the compatibility support module 208A (block 510). The compatibility support module 208A may not be located on the same computer readable medium as the EFI 206, so the processor 102 locates the compatibility support module 208A on an alternate computer readable medium such as the hard disk drive 122 of FIG. 1. The location of the compatibility support module 208A may be determined based on a location variable in the boot options of the user/hardware variable space 210. The location variable may provide an identification of the alternate computer readable medium on which the compatibility support module 208A is stored.

Alternatively, the processor system 102 may search a plurality of alternate computer readable media to determine where the compatibility support module 208A is stored by, for example, finding and matching a pre-determined identifier or signature pattern associated with compatibility support module 208A. The alternate computer readable media may include any computer readable media that is communicatively coupled to the processor in a fixed manner, such as the hard disk drive 122 and the ROM 108, or any computer readable medium that is communicatively coupled to the processor system 100 in a removable manner, such as the removable storage medium 128. Additionally, the compatibility support module 208A may also be located on a remote processor system such as the processor system 144 of FIG. 1 communicatively coupled to the processor system 100 via the network 140.

Based on the location information, the compatibility support module 208A is loaded and executed at block 514. The compatibility support module 208A establishes a hardware/software interface and system parameters that provide legacy support, thereby enabling a legacy software boot target to run on the processor system 100. After establishing an appropriate hardware/software interface, the processor 102 loads and executes the software boot target (block 510).

Although certain methods, apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method comprising:
   initializing a processor in a pre-boot environment using a first computer readable medium;
   determining if the processor requires legacy support;
   locating a compatibility support module on a second computer readable medium if the processor requires legacy support, wherein the compatibility support module is stored on at least one of a secure area or a processor system communicatively coupled to the processor via a network; and
   loading the compatibility support module into the processor.

2. A method as defined in claim 1, wherein selectively locating and loading the compatibility support module comprises locating the compatibility support module on at least one of a host protected area or a system partition of the second computer readable medium when the processor requires legacy support.

3. A method as defined in claim 1, wherein the second computer readable medium comprises a hard drive.

4. A method as defined in claim 1, wherein determining if the processor requires legacy support comprises locating and examining a device path of an operating system.

5. A method as defined in claim 1, further comprising executing the compatibility support module.

6. A method as defined in claim 5, wherein executing the compatibility support module comprises initializing at least one of a BIOS data area and legacy interrupt vectors.

7. A method as defined in claim 5, wherein executing the compatibility support module comprises executing instructions that support at least one of a legacy computer application and a legacy computer operating system.

8. A method as defined in claim 1, wherein selectively locating and loading the compatibility support module comprises searching for at least one of an identifier and a signature associated with the compatibility support module in a plurality of computer readable medium locations.

9. An apparatus comprising:
   a processor system including a pre-boot image memory and an alternate memory;
   instructions stored on the pre-boot image memory; and
   a compatibility support module stored on the alternate memory, wherein the instructions stored on the pre-boot image memory enable the processor system in a pre-boot environment to determine a legacy support requirement and to selectively load the compatibility support module based on the legacy support requirement, and wherein the compatibility support module is stored on a secure area of the alternate memory.

10. An apparatus as defined in claim 9, wherein the compatibility support module is stored on at least one of a host protected area, a system partition of the alternate memory, or a second processor system communicatively coupled to the processor system via a network.

11. An apparatus as defined in claim 9, wherein the alternate memory is a hard drive.

12. An apparatus as defined in claim 9, wherein the instructions stored on the pre-boot image memory enable the processor system to execute the compatibility support module.

13. An apparatus as defined in claim 9, wherein the compatibility support module is configured to initialize at least one of a BIOS data area and legacy interrupt vectors.

14. An apparatus as defined in claim 9, wherein the compatibility support module enables the processor system to support at least one of a legacy processor system application and a legacy processor system operating system.

15. An apparatus as defined in claim 9, wherein the legacy support requirement is determined based on a device path of an operating system.

16. A first computer readable medium having instructions stored thereon that, when executed, cause a machine to:
   initialize a processor in a pre-boot environment;
   determine if the processor system requires a legacy support; and
   locate a compatibility support module stored on a second computer readable medium if the processor system requires the legacy support, wherein the compatibility support module is stored on a processor system communicatively coupled to the processor via a network; and
   load the compatibility support module into the processor.

17. A first computer readable medium as defined in claim 16 having instructions stored thereon that, when executed, cause the machine to locate the compatibility support module on at least one of a host protected area and a system partition of the second computer readable medium.

18. A first computer readable medium as defined in claim 16 having instructions stored thereon that, when executed, cause the machine to execute the compatibility support module.

19. A first computer readable medium as defined in claim 16 having instructions stored thereon that, when executed, cause the machine to establish at least one of a BIOS data area and legacy interrupt vectors.

20. A first computer readable medium as defined in claim 16 having instructions stored thereon that, when executed, cause the machine to support at least one of a legacy computer application and a legacy computer operating system.

21. A first computer readable medium as defined in claim 16 having instructions stored thereon that, when executed, cause the machine to search for at least one of an identifier and a signature associated with the compatibility support module in a plurality of computer readable medium locations.

22. A first computer readable medium having instructions stored thereon that, when executed, cause a first machine to:
store a compatibility support module on a secure area of a second computer readable medium;
store a pre-boot image on a pre-boot image computer readable medium;
configure the pre-boot image to determine a legacy support requirement of a second machine; and
configure the pre-boot image to enable the second machine to load the compatibility support module based on the legacy support requirement.

23. A first computer readable medium as defined in claim 22 having instructions stored thereon that, when executed, cause the first machine to configure the pre-boot image to enable the second machine to execute the conditional load sequence.

24. A first computer readable medium as defined in claim 22 having instructions stored thereon that, when executed, cause the first machine to store the compatibility support module on at least one of a host protected area, a system partition of the second computer readable medium, or a processor system communicatively coupled to the second machine.

25. A first computer readable medium as defined in claim 22 comprising instructions stored thereon that, when executed, cause the first machine to configure the pre-boot image to enable the second machine to execute the compatibility support module.

26. A first computer readable medium as defined in claim 22 having instructions stored thereon that, when executed, cause the first machine to configure the compatibility support module to establish at least one of a BIOS data area and legacy interrupt vectors.

27. A first computer readable medium as defined in claim 22 having instructions stored thereon that, when executed, cause the first machine to configure the compatibility support module to support at least one of a legacy computer application and a legacy computer operating system.

28. An apparatus comprising:
a processor system including a flash memory and an alternate memory;
instructions stored on the flash memory; and
a compatibility support module stored on a secure area of the alternate memory, wherein the instructions stored on the flash memory enable the processor system in a pre-boot environment to determine a legacy support requirement and to selectively load the compatibility support module based on the legacy support requirement.

29. An apparatus as defined in claim 28, wherein the instructions stored on the flash memory enable the processor system to execute the compatibility support module.

* * * * *